US009759957B2

(12) United States Patent
Xie

(10) Patent No.: US 9,759,957 B2
(45) Date of Patent: Sep. 12, 2017

(54) TRANSFLECTIVE LIQUID CRYSTAL DISPLAY PANEL AND A LIQUID CRYSTAL DISPLAY DEVICE

(71) Applicant: BOE TECHNOLOGY GROUP CO., LTD., Beijing (CN)

(72) Inventor: Chang Xie, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 188 days.

(21) Appl. No.: 14/098,925

(22) Filed: Dec. 6, 2013

(65) Prior Publication Data
US 2014/0160402 A1 Jun. 12, 2014

(30) Foreign Application Priority Data

Dec. 11, 2012 (CN) .......................... 2012 1 0532606

(51) Int. Cl.
G02F 1/1335 (2006.01)
G02F 1/1343 (2006.01)
G02F 1/1337 (2006.01)

(52) U.S. Cl.
CPC .. G02F 1/134309 (2013.01); G02F 1/133555 (2013.01); G02F 1/134363 (2013.01); G02F 2001/133742 (2013.01); G02F 2001/134381 (2013.01)

(58) Field of Classification Search
None
See application file for complete search history.

(56) References Cited

U.S. PATENT DOCUMENTS

| 7,015,997 | B2 | 3/2006 | Choi et al. |
| 8,547,509 | B2 * | 10/2013 | Moon ............... G02F 1/133345 349/113 |
| 9,500,903 | B2 * | 11/2016 | Xie .................. G02F 1/134363 |
| 2004/0090576 | A1 | 5/2004 | Chuang |
| 2005/0001959 | A1 * | 1/2005 | Chang ........................ 349/114 |
| 2008/0002116 | A1 * | 1/2008 | Son ................... G02F 1/133555 349/114 |
| 2008/0068523 | A1 * | 3/2008 | Mitsui et al. ................. 349/37 |

(Continued)

FOREIGN PATENT DOCUMENTS

| CN | 100386676 C | | 5/2008 | |
| CN | 101266347 | * | 9/2008 | ............... G02F 1/13 |

(Continued)

OTHER PUBLICATIONS

First Chinese Office Action dated Sep. 22, 2014, Application No. 201210532606.0, Applicant BOE Technology Group Co., Ltd., 7 Pages.

(Continued)

*Primary Examiner* — Edward Glick
*Assistant Examiner* — Anthony G Quash
(74) *Attorney, Agent, or Firm* — Brooks Kushman P.C.

(57) ABSTRACT

The present invention provides a transflective liquid crystal display panel and a liquid crystal display device. By designing the electrode structure of the transmission region and the reflection region, the present invention can achieve a transflective display effect, enlarging display view, increasing contrast ratio, and realizing a single cell gap structure.

15 Claims, 3 Drawing Sheets

(56) References Cited

U.S. PATENT DOCUMENTS

2010/0110351 A1    5/2010   Kim et al.

FOREIGN PATENT DOCUMENTS

| CN | 102809843 | * 12/2012 | ......... G02F 1/13363 |
| CN | 102809843 A | 12/2012 | |

OTHER PUBLICATIONS

Chinese Communication Dated Jul. 29, 2015, Application No. 201210532606.0, Applicant BOE Technology Group Co., Ltd., 6 Pages.
CN 201210532606.0 2nd Office Action in corresponding Chinese Application; dated Mar. 11, 2015; 5 pages.
CN 201210532606.0 2nd Office Action in corresponding Chinese Application; dated Mar. 11, 2015; 6 pages; English Translation.

* cited by examiner

TRANSFLECTIVE LIQUID CRYSTAL DISPLAY PANEL AND A LIQUID CRYSTAL DISPLAY DEVICE

CROSS-REFERENCE TO RELATED APPLICATIONS

This application claims priority to Chinese application No. 201210532606.0 filed Dec. 11, 2012, which is hereby incorporated by reference in its entirety.

TECHNICAL FIELD

The present invention relates to a liquid crystal display (LCD) technology, and more particularly to a transflective liquid crystal display panel and a liquid crystal display device.

BACKGROUND

In general, a transflective liquid crystal display panel is formed by means of cell alignment between a color filter substrate and an array substrate, and a liquid crystal layer is encapsulated in the space between these two substrates. Because the liquid crystal molecules do not emit light by themselves, the display needs a light source in order to display image. The LCD display may be divided into a transmissive type, a reflective type and a transflective type according to different types of the light sources being used.

In which, the transmissive type LCD display mainly uses a backlight source as the light source, the backlight source is disposed at the rear of the liquid crystal panel, and pixel electrode of the array substrate is a transparent electrode to be used as a transmission region, which helps the light of the backlight source to pass through the liquid crystal layer to show the image. The reflective type LCD display mainly uses a front light source or an external light source as the light source, the array substrate thereof uses reflective electrodes in metal or other good reflective material as the reflection region, which is suitable to reflect the front light source or the external light source. The transflective type LCD display may be considered as a combination of the transmissive type LCD panel and the reflective type LCD panel, where not only the reflection region is provided on the array substrate, but also the transmission region is provided on the array substrate, and it can use the backlight source and the front light source or the external light source to display simultaneously.

The advantage of the transmissive type LCD display is that a bright image can be displayed in a dark environment, but the disadvantage is that the transmitted lights take up a small proportion in the lights emitted by the backlight source, and therefore the utilization of the backlight source is low. It needs to greatly increase the brightness of the backlight source so as to increase the display brightness. Thus, the energy consumption is high.

The advantage of the reflective type LCD display is that it can use the sunlight or front light source as the light source and the power consumption is relatively low, but the disadvantage is that it cannot display image in the dark environment due to its dependency on the external light source.

The transflective type LCD display has both the advantages of the transmissive type LCD panel and the advantages of the reflective type LCD panel, which can display bright image in the dark environment, and can be used indoors and outdoors. Thus, it is widely used for the display devices of portable mobile electronic products, such as cellphones, digital cameras, handheld computers, GPRS and other mobile products.

SUMMARY

The problem to be solved by the present invention is to provide a transflective liquid crystal display panel and a liquid crystal display device, which achieves a transflective liquid crystal display structure with a single cell gap and adopts a new electrode structure so as to achieve a transflective display effect. Meanwhile, the design of the electrode structure for the reflection region enlarges display view and increases contrast ratio.

The technical solutions provided by the present invention are as follows:

a transflective liquid crystal display panel, comprising: a first substrate, a second substrate disposed oppositely to said first substrate, and a liquid crystal layer disposed between said first substrate and said second substrate; wherein the liquid crystal of said liquid crystal layer is a positive liquid crystal; said first substrate and said second substrate comprise a plurality of sub-pixels, each sub-pixel comprises a reflection region and a transmission region;

the liquid crystal cell gap of said reflection region is equal to the liquid crystal cell gap of said transmission region;

a plurality of first common electrodes and first pixel electrodes alternately arranged at equal interval are disposed on a portion of said second substrate which corresponds to said transmission region; and a second common electrode corresponding to the entire reflection region is disposed on a portion of said first substrate which corresponds to said reflection region, a second pixel electrode is disposed on a portion of said second substrate which corresponds to said reflection region, and said second pixel electrode comprises at least two strip pixel electrodes disposed at interval.

Preferably, the number of the strip pixel electrodes is two.

Preferably, the first substrate further comprises:

a first base substrate; said second common electrode, formed on a side of said first base substrate closing to said second substrate, and disposed corresponding to the entire reflection region; and a first orientation layer, formed on a side of said first base substrate closing to said second substrate, located above said second common electrode, and disposed corresponding to said reflection region and said transmission region.

Preferably, the second substrate further comprises:

a second base substrate;

a reflective layer, formed on a side of said second base substrate closing to said first substrate, and disposed corresponding to the entire reflection region;

an insulating layer, formed on a side of said second base substrate closing to said first substrate, located above said reflective layer, and disposed corresponding to said reflection region and said transmission region;

a plurality of first pixel electrodes and first common electrodes, formed on a side of said insulating layer closing to said first substrate, and disposed corresponding to said transmission region;

said second pixel electrode, formed on a side of said insulating layer closing to said first substrate, and disposed corresponding to said reflection region; and a second orientation layer, formed on a side of said insulating layer closing to said first substrate, located above said first common electrode, said first pixel electrode and said second pixel electrode, and disposed corresponding to said reflection region and said transmission region.

Preferably, the liquid crystal cell gap is 3~6 μm;
the width of the first pixel electrode is 1~3 μm and the width of the first common electrode is 1~3 μm;
the interval between the first pixel electrode and the first common electrode is 4~8 μm;
the interval between the two strip pixel electrodes is 10~25 μm; and
the width of the strip pixel electrode is 2~6 μm.

Preferably, the liquid crystal cell gap is 4.4 μm;
the width of the first pixel electrode is 2 μm and the width of the first common electrode is 2 μm;
the interval between the first pixel electrode and the first common electrode is 6 μm;
the interval between the two strip pixel electrodes is 18 μm; and
the width of the strip pixel electrode is 4 μm.

Preferably, the voltage applied to the first common electrode is equal to the voltage applied to the second common electrode.

Preferably, the first substrate is a color filter substrate; the second substrate is an array substrate.

A liquid crystal display device, comprising the liquid crystal display panel as described above.

Preferably, the liquid crystal display device further comprises:

a first polarizer, formed on a side of said first base substrate away from said second substrate, and disposed corresponding to said reflection region and said transmission region; and a second polarizer, formed on a side of said second base substrate away from said first substrate, and disposed corresponding to said reflection region and said transmission region.

The advantageous effects of the above technical solutions of the present invention are as follows:

in the above technical solutions, it can achieve the transflective display effect by making a design to the electrode structure of the transmission region and the reflection region. Meanwhile, the design of the electrode structure for the reflection region enlarges display view and increases contrast ratio. In addition, it can achieve the single cell gap structure and simplifying the difficulties of the process.

The present invention will be more clearly understood from the description of preferred embodiments as set forth below, with reference to the accompanying drawings.

DETAILED DESCRIPTION

Figure 1:
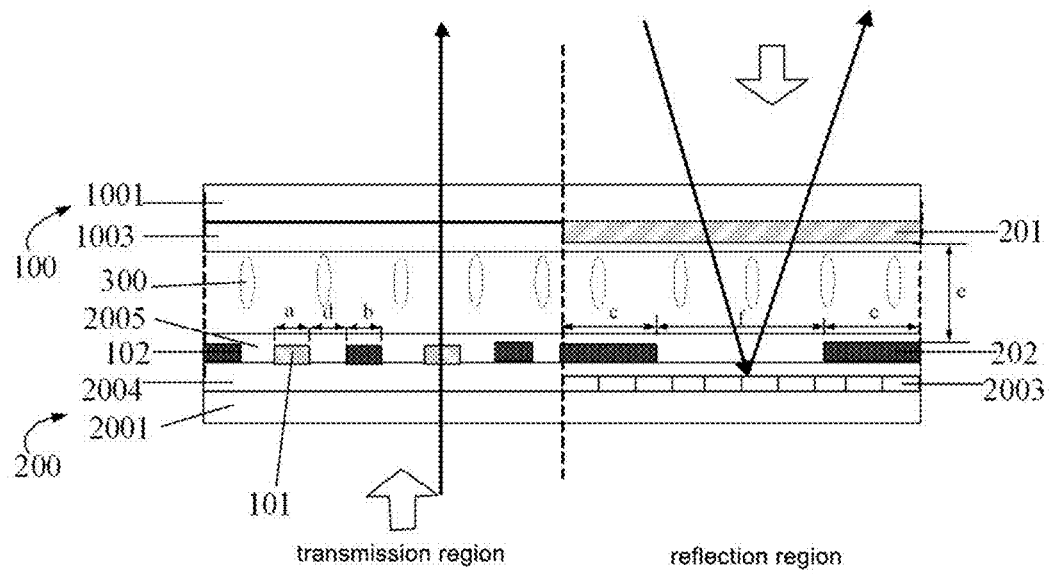
FIG. 1 is a structural schematic view showing the transflective liquid crystal display panel of the present invention when a voltage is not applied.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Hereafter, to make the problems to be solved, technical solutions and advantages of the present invention more clearly, the present invention will be described in detail with reference to the drawings and the specific embodiments.

As shown in FIGS. 1 to 5, an embodiment of the present invention provides a transflective liquid crystal display panel, comprises a first substrate 100, a second substrate 200 disposed oppositely to the first substrate 100, and a liquid crystal layer disposed between the first substrate 100 and the second substrate 200, the liquid crystal layer is a positive liquid crystal layer;

in which, the first substrate 100 and the second substrate 200 comprise a plurality of sub-pixels, each sub-pixel comprises a reflection region and a transmission region;

the liquid crystal cell gap of the reflection region is equal to the liquid crystal cell gap of the transmission region;

a plurality of first common electrodes 101 and first pixel electrodes 102 alternately arranged at equal interval are disposed on a portion of the second substrate 200 which corresponds to the transmission region; and a second common electrode 201 corresponding to the entire reflection region is disposed on a portion of the first substrate 100 which corresponds to the reflection region, a second pixel electrode 202 is disposed on a portion of the second substrate 200 which corresponds to the reflection region, and the second pixel electrode 202 comprises at least two strip pixel electrodes disposed at certain interval.

Figure 5:
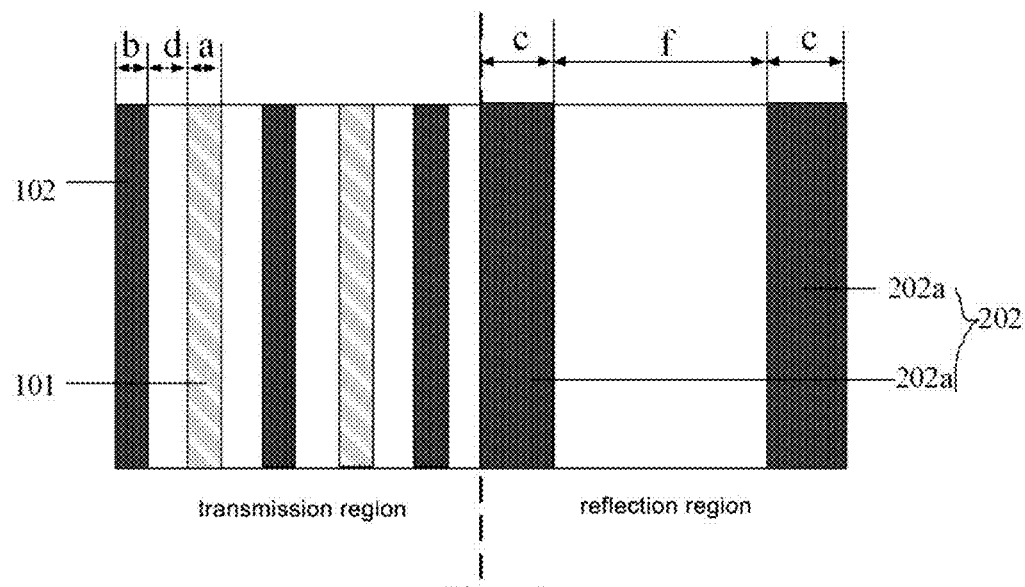
FIG. 5 is a schematic top view showing the electrode structure of the second substrate of the transflective liquid crystal display panel of the present invention.

Preferably, as shown in 202a of FIG. 5, the number of the strip pixel electrodes is two in the embodiment.

According to the transflective liquid crystal display panel provided in the embodiment, because the electrode structure having an In Plane Switching (IPS) mode is adopted for the transmission region, when a voltage is applied, a horizontal electric field is formed in the transmission region. While a special electrode structure is used for the reflection region, an integral second common electrode 201 is disposed in the reflection region of the first substrate 100, and the two strip pixel electrodes 202a disposed at certain interval are disposed in the reflection region of the second substrate 200, so that a part of non-faced region (i.e., the region corresponding to the interval between the two strip pixel electrodes 202a) is formed between the second common electrode 201 and the two strip pixel electrodes 202a. When a voltage is applied, the electric field lines will be arranged in an inclined direction, positive liquid crystal molecules 300 will be deflected in two directions with different inclined angles due to the influence from the inclined electric field, thereby enlarging the display view, improving contrast ratio, and achieving the single cell gap structure.

Figure 2:
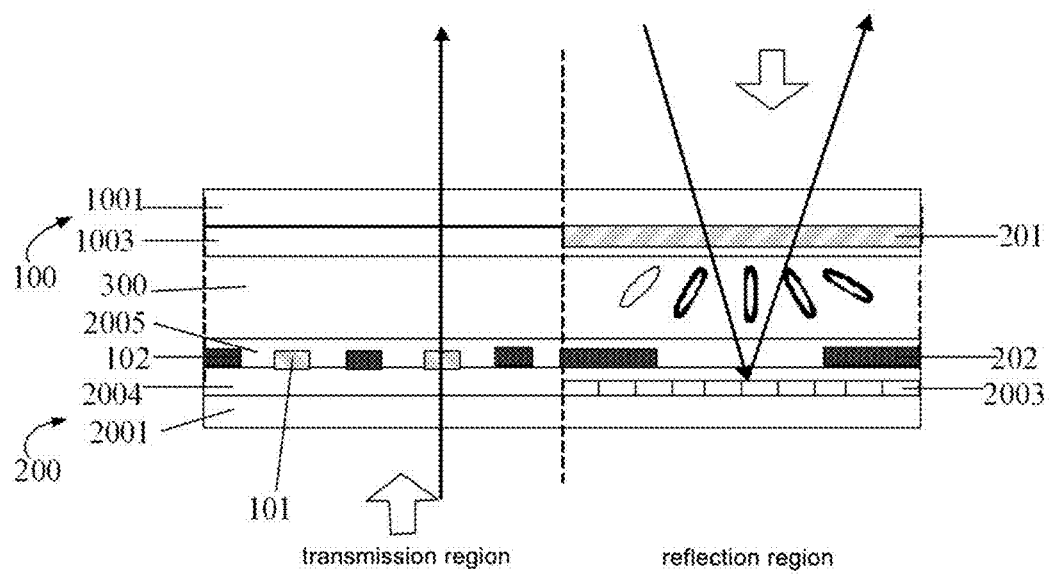
FIG. 2 is a structural schematic view showing the transflective liquid crystal display panel of the present invention when a voltage is applied.
Figure 3:
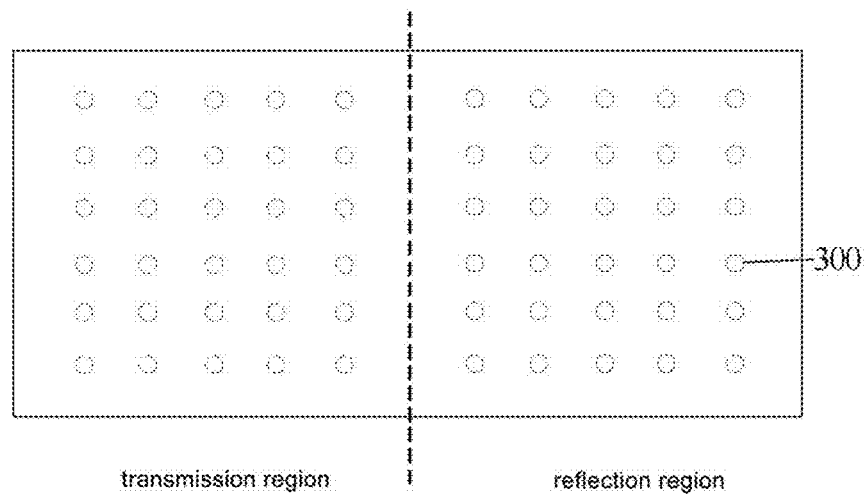
FIG. 3 is a top view showing the transflective liquid crystal display panel of the present invention when a voltage is not applied.
Figure 4:
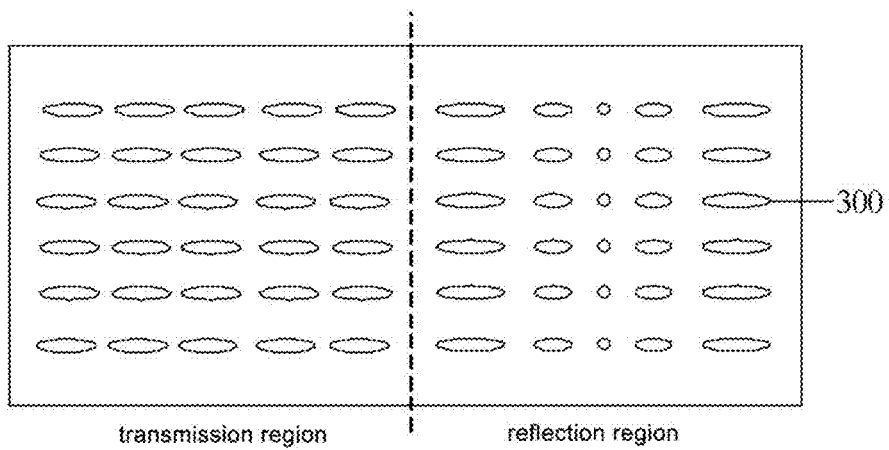
FIG. 4 is a top view showing the transflective liquid crystal display panel of the present invention when a voltage is applied.

In details, FIG. 1 is a structural schematic view showing the transflective liquid crystal display panel according to the embodiment when a voltage is not applied. FIG. 3 is a top view showing an arrangement manner of the positive liquid crystal molecules 300 of FIG. 1. FIG. 2 is a structural schematic view showing the transflective liquid crystal display panel according to the embodiment when a voltage is applied. FIG. 4 is a top view showing an arrangement manner of the positive liquid crystal molecules of FIG. 2.

Preferably, a first orientation layer 1003 is disposed on the first substrate 100, and a second orientation layer 2005 is disposed on the second substrate 200. As shown in FIGS. 1 and 3, when a voltage is not applied, in the transmission region and the reflection region, both the first orientation layer 1003 of the first substrate 100 (for example, a color filter substrate) and the second orientation layer 2005 of the second substrate 200 (for example, an array substrate) according to the embodiment of the present invention are oriented in a vertically manner, so that the positive liquid crystal molecules 300 are oriented vertically when a voltage is not applied thereto, which can reduce light leakage in dark state and increase contrast ratio.

As shown in FIGS. 2 and 4, when a voltage is applied, in the transmission region, the positive liquid crystal molecules 300 will be changed gradually to the horizontal arrangement manner as shown in FIGS. 2 and 4 due to influence from the horizontal electric field, and generate a large phase delay in the horizontal direction.

When a voltage is applied, in the reflection region, the positive liquid crystal molecules 300 will be changed gradually to the arrangement manner as shown in FIGS. 2 and 4 due to influence from the inclined electric field, and generate a small phase delay in the horizontal direction.

The transflective display effect in single cell gap structure can be achieved by means of optimizing the width b of the first pixel electrode 102, the width a of the first common electrode 101, the interval d between the first common electrode 101 and the first pixel electrode 102 in the transmission region, as well as, the interval e between the second common electrode 201 and the second pixel electrode 202, the width c of the strip pixel electrodes 202a and the interval f between the two strip pixel electrodes 202a in the reflection region, so that the light though the transmission region can generate more phase delay than the phase delay generated though the reflection region.

It is assumed that the light passed through the positive liquid crystal of the transmission region under the action of the horizontal electric field will generate a large horizontal phase delay $\Delta n1$, whereas a small horizontal phase delay $\Delta n2$ is generated by the light passing through the positive liquid crystal of the reflection region under the action of the inclined electric field. In order to realize the transflective display, the needed amount of phase delay of the light passed though the liquid crystal of the transmission region is $\Delta n1 \times dn = \lambda/2$; in which do represents the optical path of the light of the transmission region passed though the liquid crystal. The amount of phase delay of the light passed though the liquid crystal of the reflection region once is $\Delta n2 \times dm = \lambda/4$; in which dm represents the optical path of the light of the reflection region passed though the liquid crystal once.

However, as for the transmission region and the reflection region, under the action of the electric field, if $\Delta n$ generated by the light passing through the liquid crystal of the transmission region is twice of $\Delta n$ generated by the light passing through the liquid crystal of the reflection region, i.e., $\Delta n1/\Delta n2 = 2$, the optical path of the light of the transmission region passing though the liquid crystal is equal to the optical path of the light of the reflection region passing though the liquid crystal once, i.e., dn=dm. As seen from the overall effect, $\Delta n1 \times dn = 2\Delta n2 \times dm$. But in the reflection region, the light needs to pass though the liquid crystal of the reflection region twice, thereby the phase delay of the light passing though the liquid crystal of the transmission region is matched with the phase delay of the light passing though the liquid crystal of the reflection region, and the transflective display effect can achieved in the end.

A preferred embodiment is provided as below. By means of optimizing the width b of the first pixel electrode 102, the width a of the first common electrode 101, the interval d between the first common electrode 101 and the first pixel electrode 102 in the transmission region, as well as, the interval e between the second common electrode 201 and the second pixel electrode 202, the width c of the strip pixel electrode 202a and the interval f between the two strip pixel electrodes 202a in the reflection region, the transflective display effect can be achieved.

In details, as shown in FIGS. 1, 2 and 5, in the transflective liquid crystal display panel according to the embodiment, the two strip pixel electrodes 202a are distributed in the reflection region, and the two strip pixel electrodes 202a are disposed respectively on the positions corresponding to both ends of the second common electrode 201. That is to say, the two strip pixel electrodes 202a are disposed corresponding to the edges of the reflection region;

the liquid crystal cell gap (that is, the interval e between the second common electrode 201 and the second pixel electrode 202) is 3~6 µm;

the width b of the first pixel electrode 102 is 1~3 µm;

the width a of the first common electrode 101 is 1~3 µm, i.e., the width b of the first pixel electrode 102 is equal to the width a of the first common electrode 101;

the interval d between the first pixel electrode 102 and the first common electrode 101 is 4~8 µm;

the interval f between the two strip pixel electrodes 202a is 10~25 µm; and the width c of each strip pixel electrode 202a is 2~6 µm.

Further preferably, the liquid crystal cell gap is 4.4 µm;

the width b of the first pixel electrode 102 is 2 µm and the width a of the first common electrode 101 is 2 µm;

the interval d between the first pixel electrode 102 and the first common electrode 101 is 6 µm;

the interval f between the two strip pixel electrodes 202a is 18 µm; and the width c of each strip pixel electrode 202a is 4 µm.

It should be understood that, in the practical application, the width b of the first pixel electrode 102, the width a of the first common electrode 101, the interval d between the first common electrode 101 and the first pixel electrode 102 in the transmission region, as well as, the interval e between the second common electrode 201 and the second pixel electrode 202, the widths c of the two strip pixel electrodes 202a and the interval f between the two strip pixel electrodes 202a in the reflection region are not limited to the preferred ones as provided in the embodiments.

Additionally, the embodiment further provides a preferred assembly manner for the first substrate 100 and second substrate 200. As shown in FIGS. 1 and 2, the first substrate 100 comprises a first base substrate 1001; the second common electrode 201 disposed corresponding to the entire reflection region, formed on a side of the first base substrate 1001 closing to the second substrate 200; the first substrate 100 further comprises the first orientation layer 1003, formed on a side of the first base substrate 1001 closing to the second substrate 200, located above the second common electrode 201, and disposed corresponding to the entire reflection region and transmission region.

The second substrate 200 comprises a second base substrate 2001; a reflective layer 2003, formed on a side of the second base substrate 2001 closing to the first substrate 100, and disposed corresponding to the entire reflection region; a insulating layer 2004, formed on a side of the second base substrate 2001 closing to the first substrate 100, located above the reflective layer 2003, and disposed corresponding to the entire reflection region and transmission region; a plurality of first pixel electrodes 102 and first common electrodes 101, formed on a side of the insulating layer 2004 closing to the first substrate 100, and disposed corresponding to the transmission region; the second pixel electrode 202 disposed corresponding to the reflection region, and formed on a side of the insulating layer 2004 closing to the first substrate 100; the second substrate 200 further comprises a second orientation layer 2005, formed on a side of the insulating layer 2004 closing to the first substrate 100, located above the first common electrode 101, the first pixel electrode 102 and the second pixel electrode 202, and disposed corresponding to the reflection region and the transmission region.

In which, the portion of the insulating layer 2004 corresponding to the transmission region is located between the second base substrate 2001 and the first pixel electrode 102 and the first common electrode 101; the portion of the insulating layer 2004 corresponding to the reflection region is located between the second pixel electrode 202 and the reflective layer 2003. The insulating layer 2004 is located on a side of the reflective layer 2003 away from the second base substrate 2001, which may play the role of insulation on one hand, and avoiding the cell gap of the transmission region and the cell gap of reflection region being unequal caused by the reflective layer 2003 being disposed in the reflection region on the other hand.

The first orientation layer 1003 is located on a side of the second common electrode 201 away from the first base substrate 1001, while the second orientation layer 2005 is located on a side of the first common electrode 101, the first pixel electrode 102 and the second pixel electrode 202 away from the second base substrate 2001, which can play the role of making the positive liquid crystal molecules 300 be vertically oriented when a voltage is not applied thereto on one hand, and avoiding the cell gap of the transmission region and the cell gap of reflection region being unequal caused by arrangements of each electrode.

The first base substrate 1001 and the second base substrate 2001 may selected from glass, quartz, transparent resin and other materials, which are not limited herein.

Additionally, it should be noted that, in the transflective liquid crystal display panel provided by the embodiment, the voltage applied to the first common electrode 101 is equal to the voltage applied to the second common electrode 201. While the voltage applied to the first pixel electrode 102 may be equal to the voltage applied to the second pixel electrode 202, or the voltage applied to the first pixel electrode 102 may be not equal to the voltage applied to the second pixel electrode 202. That is to say, the first pixel electrode 102 and the second pixel electrode 202 may be powered by the same TFT or different TFTs.

Preferably, in the transflective liquid crystal display panel provided by the embodiment, the first substrate 100 is a color filter substrate, and the second substrate 200 is an array substrate.

According to another embodiment of the present invention, it provides a liquid crystal display device comprises the liquid crystal display panel as described above. The liquid crystal display device may be mobile phone, tablet computer, television, monitor, notebook computer, digital picture frame, navigation system and any other products or parts having display function.

Figure 6:
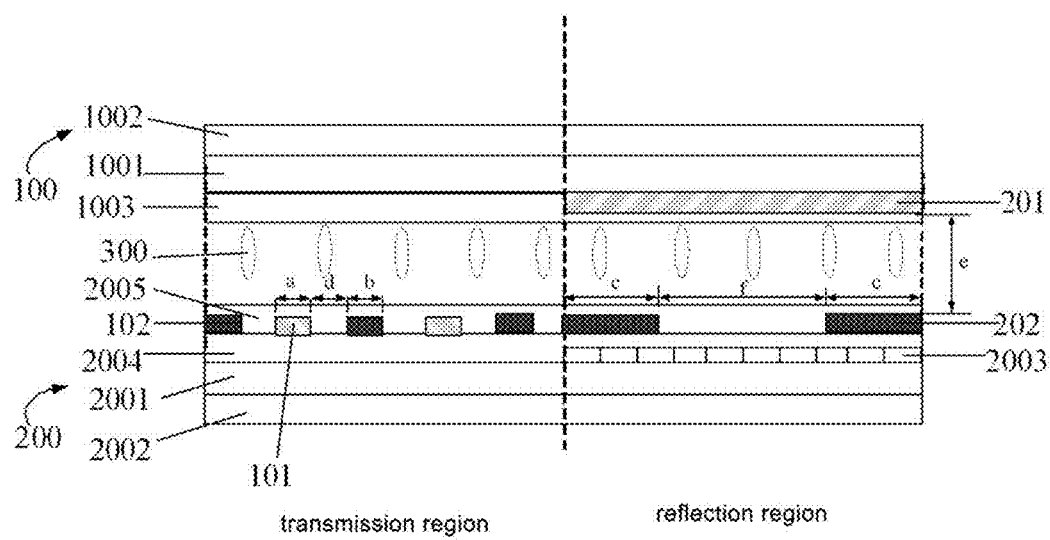
FIG. 6 is a structural schematic view showing the liquid crystal display device of the present invention.

Preferably, as shown in FIG. 6, the liquid crystal display device provided by the embodiment further comprises a first polarizer 1002, formed on a side of the first base substrate 1001 away from the second substrate 200, and disposed corresponding to the reflection region and the transmission region; a second polarizer 2002, formed on a side of the second base substrate 2001 away from the first substrate 100, and disposed corresponding to the reflection region and the transmission region.

The preferred embodiments of the present invention have been described as above, it should be noted that, for those skilled in the art, various improvements and modifications can be made hereto without departing from the spirit of the present invention, and the improvements and modifications also should be included in the scope of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transflective liquid crystal display panel, comprising: a first substrate, a second substrate disposed oppositely to said first substrate, and a liquid crystal layer disposed between said first substrate and said second substrate; wherein said liquid crystal layer is a positive liquid crystal layer; said first substrate and said second substrate comprise a plurality of sub-pixels, each sub-pixel comprises a reflection region and a transmission region;

wherein the liquid crystal cell gap of said reflection region is equal to the liquid crystal cell gap of said transmission region;

a plurality of first common electrodes and first pixel electrodes alternately arranged at equal interval are disposed on a portion of said second substrate which corresponds to said transmission region; and a second common electrode corresponding to the entire reflection region is disposed on a portion of said first substrate which corresponds to said reflection region, a second pixel electrode is disposed on a portion of said second substrate which corresponds to said reflection region, and said second pixel electrode consists of two strip pixel electrodes which are respectively arranged on two edges of the portion of said second substrate which corresponds to the said reflection region.

2. The transflective liquid crystal display panel according to claim 1, wherein said first substrate comprises:

a first base substrate;

said second common electrode, formed on a side of said first base substrate closing to said second substrate, and disposed corresponding to the entire reflection region; and a first orientation layer, formed on a side of said first base substrate closing to said second substrate, located above said second common electrode, and disposed corresponding to said reflection region and said transmission region.

3. The transflective liquid crystal display panel according to claim 2, wherein said first substrate is a color filter substrate; said second substrate is an array substrate.

4. The transflective liquid crystal display panel according to claim 1, wherein said second substrate comprises:
- a second base substrate;
- a reflective layer, formed on a side of said second base substrate closing to said first substrate, and disposed corresponding to the entire reflection region;
- an insulating layer, formed on a side of said second base substrate closing to said first substrate, located above said reflective layer, and disposed corresponding to said reflection region and said transmission region;
- a plurality of first pixel electrodes and first common electrodes, formed on a side of said insulating layer closing to said first substrate, and disposed corresponding to said transmission region;
- said second pixel electrode, formed on a side of said insulating layer closing to said first substrate, and disposed corresponding to said reflection region; and
- a second orientation layer, formed on a side of said insulating layer closing to said first substrate, located above said first common electrode, said first pixel electrode and said second pixel electrode, and disposed corresponding to said reflection region and said transmission region.

5. The transflective liquid crystal display panel according to claim 4, wherein said first substrate is a color filter substrate; said second substrate is an array substrate.

6. The transflective liquid crystal display panel according to claim 1, wherein said liquid crystal cell gap is 3~6 μm;
- the width of said first pixel electrode is 1~3 μm and the width of said first common electrode is 1~3 μm;
- the interval between said first pixel electrode and said first common electrode is 4~8 μm;
- the interval between the two strip pixel electrodes is 10~25 μm; and
- the width of said strip pixel electrode is 2~6 μm.

7. The transflective liquid crystal display panel according to claim 6, wherein said liquid crystal cell gap is 4.4 μm;
- the width of said first pixel electrode is 2 μm and the width of said first common electrode is 2 μm;
- the interval between said first pixel electrode and said first common electrode is 6 μm;
- the interval between the two strip pixel electrodes is 18 μm; and
- the width of said strip pixel electrode is 4 μm.

8. The transflective liquid crystal display panel according to claim 7, wherein said first substrate is a color filter substrate; said second substrate is an array substrate.

9. The transflective liquid crystal display panel according to claim 6, wherein said first substrate is a color filter substrate; said second substrate is an array substrate.

10. The transflective liquid crystal display panel according to claim 1, wherein the voltage applied to said first common electrode is equal to the voltage applied to said second common electrode.

11. The transflective liquid crystal display panel according to claim 10, wherein said first substrate is a color filter substrate; said second substrate is an array substrate.

12. The transflective liquid crystal display panel according to claim 1, wherein said first substrate is a color filter substrate; said second substrate is an array substrate.

13. A liquid crystal display device, comprising said liquid crystal display panel according to claim 1.

14. The liquid crystal display device according to claim 13, further comprising:
- a first polarizer, formed on a side of said first base substrate away from said second substrate, and disposed corresponding to said reflection region and said transmission region; and
- a second polarizer, formed on a side of said second base substrate away from said first substrate, and disposed corresponding to said reflection region and said transmission region.

15. The transflective liquid crystal display panel according to claim 1, wherein said first substrate comprises:
- a first base substrate;
- said second common electrode, formed on a side of said first base substrate closing to said second substrate, and disposed corresponding to the entire reflection region; and
- a first orientation layer, formed on a side of said first base substrate closing to said second substrate, located above said second common electrode, and disposed corresponding to said reflection region and said transmission region; and wherein said second substrate comprises:
- a second base substrate;
- a reflective layer, formed on a side of said second base substrate closing to said first substrate, and disposed corresponding to the entire reflection region;
- an insulating layer, formed on a side of said second base substrate closing to said first substrate, located above said reflective layer, and disposed corresponding to said reflection region and said transmission region;
- a plurality of first pixel electrodes and first common electrodes, formed on a side of said insulating layer closing to said first substrate, and disposed corresponding to said transmission region;
- said second pixel electrode, formed on a side of said insulating layer closing to said first substrate, and disposed corresponding to said reflection region; and
- a second orientation layer, formed on a side of said insulating layer closing to said first substrate, located above said first common electrode, said first pixel electrode and said second pixel electrode, and disposed corresponding to said reflection region and said transmission region.

* * * * *